United States Patent [19]
Choy et al.
[11] Patent Number: 4,741,858
[45] Date of Patent: May 3, 1988

[54] TIMED-RELEASE HYPOCHLORITE BLEACH COMPOSITIONS

[75] Inventors: Clement K. Choy, Walnut Creek; Gregory van Buskirk, Danville, both of Calif.
[73] Assignee: The Clorox Company, Oakland, Calif.

[21] Appl. No.: 20,240
[22] Filed: Mar. 2, 1987
[51] Int. Cl.[4] .......... C09K 3/00; C11D 3/075
[52] U.S. Cl. .......... 252/186.36; 252/99; 252/103; 252/174.12; 252/187.25; 252/383
[58] Field of Search .......... 252/96, 97, 99, 103, 252/187.25, 186.36, 385

[56] References Cited

U.S. PATENT DOCUMENTS

| | | | |
|---|---|---|---|
| 2,534,781 | 12/1950 | MacMahon | 252/99 |
| 2,695,274 | 11/1954 | MacMahon | 252/99 |
| 3,008,903 | 11/1961 | Habernickel et al. | 252/187 |
| 3,036,013 | 5/1962 | Jaszka et al. | 252/99 |
| 3,123,521 | 3/1964 | Wentworth et al. | 167/17 |
| 3,171,814 | 3/1965 | Orazem et al. | 252/187 |
| 3,278,447 | 10/1966 | McNicholas | 252/187 |
| 3,364,147 | 1/1968 | Stamm | 252/99 |
| 3,491,028 | 1/1970 | Crotty et al. | 252/103 |
| 3,530,071 | 9/1970 | Moore | 252/99 |
| 3,591,515 | 7/1971 | Lovely | 252/187 |
| 3,893,954 | 7/1975 | Tivin et al. | 252/548 |
| 3,983,254 | 9/1976 | Alterman et al. | 428/403 |
| 3,998,751 | 12/1976 | Murray | 252/187 H |
| 4,078,099 | 3/1978 | Mazzola | 427/213 |
| 4,126,573 | 11/1978 | Johnston | 252/99 |
| 4,136,052 | 1/1979 | Mazzola | 252/94 |
| 4,156,039 | 5/1979 | Klebe et al. | 427/215 |
| 4,194,025 | 3/1980 | Klebe et al. | 427/215 |
| 4,207,197 | 6/1980 | Davis et al. | 252/99 |
| 4,219,435 | 8/1980 | Biard et al. | 252/90 |
| 4,268,411 | 5/1981 | Iwata et al. | 252/316 |
| 4,272,398 | 6/1981 | Jaffe | 252/316 |
| 4,273,672 | 6/1981 | Vassiliades | 252/316 |
| 4,279,764 | 7/1981 | Brubaker | 252/99 |
| 4,300,897 | 11/1981 | Gray | 8/111 |
| 4,309,299 | 1/1982 | Rapisarda et al. | 252/95 |
| 4,327,151 | 4/1982 | Mazzola | 428/407 |

FOREIGN PATENT DOCUMENTS

| | | |
|---|---|---|
| 1374207 | 11/1974 | United Kingdom . |
| 1439909 | 6/1976 | United Kingdom . |
| 1584283 | 2/1981 | United Kingdom . |
| 2148340A | 10/1984 | United Kingdom . |

OTHER PUBLICATIONS

Chem. Abs. 90:73602r, Klebe, et al. (1978).
*CRC Handbook of Chemistry and Physics*, p. B-190.
Ellestad, "Lithium Hypochlorite Bleaches," in *Soap and Chemical Specialties*, pp. 77–79, 122–3 (Sep. 1961).
Lithcoa Product Bulletin.
Chem. Abs. 89:216748k, Kanter et al. (1977).
Chem. Abs. 90:25498q, Korzhenyak, et al. (1978).
Chem. Abs. 90:73603s, Klebe, et al. (1978).

*Primary Examiner*—Paul Lieberman
*Assistant Examiner*—John F. McNally
*Attorney, Agent, or Firm*—Majestic, Gallagher, Parsons & Siebert

[57] ABSTRACT

Timed-release bleaching compounds containing encapsulated hypochlorite bleaching agents are disclosed, along with a method for using the compounds. A preferred embodiment of the invention includes sodium silicate-coated lithium hypochlorite. One or more additional coatings to further delay timed release are optional. The novel bleach compounds are especially useful in reducing fabric and dye damage in fabric bleaching while facilitating the inclusion of optional laundry additives such a enzymes and brighteners. The encapsulates have good shelf stability and are effective over a wide range of temperatures and concentrations.

11 Claims, No Drawings

TIMED-RELEASE HYPOCHLORITE BLEACH COMPOSITIONS

This is a continuation of application Ser. No. 725,229, filed Apr. 19, 1985, now abandoned.

FIELD OF THE INVENTION

The present invention relates generally to halogen bleach compositions, and more particularly, to timed-release encapsulated hypochlorite bleach compositions.

BACKGROUND OF THE INVENTION

Chlorine bleach compositions are generally recognized as having greater oxidizing power than peroxygen bleaches. Peroxygen bleaches such as those containing peroxyacids and peroxyacid salts are well known, and are taught in a number of patents, e.g. U.S. Pat. Nos. 3,956,159 to Jones, 4,028,263 to Gray, and 4,473,507 to Bossu. Because chlorine bleaches are stronger oxidants than peroxygen bleaches, however, they are more effective on oxidizable stains generally. Bleaches which release hypochlorite ion are particularly effective, as is known in the art. See, e.g., U.S. Pat. Nos. 2,534,781 to MacMahon and 3,008,903 to Habernickel et al.

Because hypochlorite-releasing bleaches are such effective oxidants, however, problems may arise. Fabric and dye damage may result from locally high concentrations of chlorine or bromine, as under misuse conditions where the dry bleach is not diluted with wash water prior to introduction of fabrics or where bleach granules have settled on fabrics subsequent to laundering. Additionally, chlorine as well as peroxygen bleaches are incompatible with other, optional, laundry additives, such as either enzymes or optical brighteners. Oxidizing agents can render these enzymes and brighteners ineffective.

Several solutions have been proposed to counter these problems. One proposed solution to the problem of enzyme degradation in particular is the introduction of a chlorine scavenger into a bleach composition in order to delay the release of chlorine into the wash water. In U.S. Pat. No. 3,893,954 to Tivin et al., for example, a hydroxyamine compound is added to an enzyme-containing detergent to react with residual chlorine. Another proposed solution to the problem of fabric damage caused by high chlorine concentration is the addition of diluents to the dry bleach which are admixed, compacted and granulated with the bleach itself. U.S. Pat. No. 4,309,299 to Rapisarda et al. shows, for example, the admixture and compaction of diluents such as succinates and citrates with chlorine bleaches to improve chlorine retention characteristics. Stabilizers such as potassium carbonate have also been used, as taught in U.S. Pat. No. 2,695,274 to MacMahon et al.

Another approach to solving the problems caused by excess chlorine in solution is encapsulation of the bleach. Encapsulation techniques are known for both peroxygen and chlorine bleaches. U.S. Pat. No. 4,126,573 to Johnston, for example, shows the encapsulation of a peroxyacid bleach with a water-soluble surfactant compound. Several patents teach the use of coatings derived from fatty acids, such as U.S. Pat. No. 4,327,151 to Mazzola, which discloses an encapsulated bleaching agent having an inner coating of a fatty acid and a microcrystalline wax, and an outer coating of a fatty acid and pluronic surfactants, and U.S. Pat. No.

3,983,254 to Alterman, which shows a method of encapsulating bleaching agents with fatty acids and alkali metal salts of fatty acids. Other encapsulated bleaches are also known. For example, U.S. Pat. No. 4,279,764 to Brubaker shows encapsulation of a mixture of an organic nitrogen-containing halogen bleaching agent, an N-H containing compound, and a soluble inorganic hydratable salt. U.S. Pat. No. 3,036,013 to Jaszka teaches an encapsulated calcium hypochlorite bleach. While the inventions of these patents share the same characteristic of encapsulation, they vary as to temperature dependence, shelf stability, and most importantly, as to the timing of the bleach release.

In order to provide an effective timed-release bleach, not only must hypochlorite release into aqueous solution be delayed, but the timing for complete release into solution must also be controlled. That is, even where the solubility of the encapsulate coating is selected such that hypochlorite release is delayed, complete release must in addition be accomplished before the end of the wash cycle to avoid settling of bleach capsules on fabric. Such settling could cause fabric and dye damage. This problem has been found, for example, with some coated calcium hypochlorite bleaches. Elimination of the problem requires a coating with appropriate solubility characteristics and one which will not interact with the bleach granules in a way that is inhibitory to the dissolution process.

It is also desirable to provide a bleach that in addition to having superior timed-release characteristics, also has good storage life, is effective over a broad range of concentrations, and is also effective over a broad range of temperatures.

SUMMARY OF THE INVENTION

Accordingly, it is an object of the present invention to provide a shelf-stable chlorine bleach composition which minimizes fabric and dye damage while facilitating the inclusion of other desirable laundry additives such as enzymes and optical brighteners.

Another object of the invention is to provide a timed-release bleach constituting a coating-encapsulated hypochlorite-releasing bleach compound, the solubility of which coating is chosen such that the release of hypochlorite into solution is delayed from about 1 to about 5 minutes and is complete within about 15 minutes.

Still another object of the invention is to provide a timed-release hypochlorite bleach composition which is effective over a broad range of temperatures and concentrations.

A further object of the invention is to provide an integrated hypochlorite bleach system effective on both oxidizable and proteinaceous stains, including a timed-release coating-encapsulated hypochlorite bleach, enzymes and optical brighteners.

Still another object of the invention is to provide a method of reducing dye damage in fabrics, by first dissolving in water a predetermined amount of a composition including a timed-release coating-encapsulated hypochlorite bleach, and then contacting fabrics with the bleach solution for a predetermined amount of time.

In one aspect of the present invention, a bleach composition comprises a bleaching agent encapsulated with one or more coatings chosen such that desirable timed-release characteristics are provided. A preferred bleaching agent is lithium hypochlorite, for which compatible coatings include alkali metal silicate, carbonate, sulfate, and phosphate salts, and mixtures thereof. Particularly preferred coatings include sodium silicate, lithium carbonate, lithium sulfate and sodium hexametaphosphate.

In another embodiment of the present invention, one or more additional coatings may be used, such that timed release is further delayed. Although a number of compounds may serve as suitable outer coatings, a particularly preferred compound for this purpose is an alkylated quaternary ammonium salt such as distearyldimethylammonium chloride.

In another aspect of the present invention, the timed-release coating-encapsulated hypochlorite bleach is combined with other laundry additives such as enzymes and brighteners in a comprehensive bleach system. The comprehensive system may be used in a method for reducing dye damage in fabric bleaching.

DETAILED DESCRIPTION OF THE INVENTION

Compositions in accordance with the present invention have two essential components: a hypochlorite-releasing bleaching agent and an alkali salt coating. The primary purpose of these encapsulates is to delay release of hypochlorite into aqueous solution so that the probability of localized high concentrations of chlorine is minimized. At the same time, it is desired that release of hypochlorite into solution be complete prior to the end of the wash cycle so that settling of the hypochlorite granules on fabrics is prevented. To accomplish these purposes, the solubility of the coating in water must first of all be limited. Also, the coating must be comprised of a compound that does not interact with the bleaching agent in a way that is inhibitory to release in aqueous solution.

In one embodiment of the present invention, a preferred bleaching agent is lithium hypochlorite. Encapsulate coatings compatible with lithium hypochlorite include alkali metal silicates, carbonates, sulfates, phosphates and mixtures thereof. Preferred coatings include sodium silicate, lithium carbonate, lithium sulfate, and sodium hexametaphosphate. A particularly preferred coating is sodium silicate, which is believed to form a lithium metasilicate interface around the lithium hypochlorite encapsulate. It had previously been believed that lithium metasilicate was insoluble. It has been surprisingly discovered that the lithium metasilicate interface has a limited solubility that accounts for the superior delayed release characteristics of the present invention.

By contrast, silicate-coated calcium hypochlorite does not completely dissolve within the period of a wash cycle, and as a result may create pinholing problems and other damage. This is believed to be due to the formation of an insoluble calcium silicate shell around the bleach granules. The present invention, however, provides both an initial delay in release time and complete release within the period of the wash cycle. Thus, sodium silicate-coated lithium hypochlorite provides a substantial improvement over prior encapsulated hypochlorite bleaches.

The preferred sodium silicate coating is comprised of $SiO_2$ and $Na_2O$. Both the delay release time and the complete release time are dependent on the weight ratio of $SiO_2$ to $Na_2O$ in the encapsulate coating. A low ratio yields a fairly short delay time, while a high ratio results in an impracticably long delay. Where the silicate ratio is high, the time for complete release is also impracticably prolonged. Preferred delay times, providing adequate time for wash water to fill a machine, range from 1 to 5 minutes. Preferred time for complete release is on the order of 15 minutes or less, so that there will be no residual hypochlorite granules settling on fabric after completion of the wash cycle. Delay and complete release times also vary with temperature. A higher temperature results in a shorter delay time as well as in a shorter time for complete release. Optimal $SiO_2$:$Na_2O$ ratios, considering both desirable timed-release characteristics as well as possible temperature variance, range from about 0.5:1 to about 3.8:1. Particularly preferred ratios range from about 2.5:1 to about 3.2:1.

The silicate-coated lithium hypochlorite bleach is effective over a wide range of temperatures. This is in sharp contrast to the action of peroxygen bleaches generally, which are primarily effective as bleaches only at higher wash temperatures. The present compositions are effective at temperatures ranging from about 40 to about 130 degrees Fahrenheit, and are especially effective at average wash cycle temperatures ranging from about 70 to about 130 degrees Fahrenheit.

One or more outer coatings may be added in order to further delay timed release. Suitable second coatings include inversely soluble cellulose derivatives (i.e., whose solubility decreases with increasing temperature, such as hydroxybutyl- or hydroxypropyl-methylcellulose ether, manufactured by Dow Chemical Co., Midland, MI, under the trademark METHOCEL), inversely soluble polyols (such as PLURONIC F-108 and F-127 polyols ("PLURONIC" is a trademark of BASF Wyandotte Corp., Wyandotte, MI), manufactured by BASF Wyandotte Corp., Parsippany, N.J.) and surfactant-type compounds such as alkylated quaternary ammonium salts. An especially preferred second coating of this latter type is distearyldimethylammonium chloride (such as that manufactured by Sherex Chemical Co., Dublin, OH, under the trademark AROSURF).

In an alternative embodiment, the second coat may comprise an inverse solubility salt (i.e., a salt whose solubility decreases, rather than increases, with increasing temperature) such as lithium carbonate, silicate or sulfate, or sodium acetate or hexametaphosphate.

In still another embodiment, a third coating may be added which preferably comprises distearyldimethylammonium chloride.

Encapsulation may be effected using any of a number of methods known in the art. For example, the method used to provide the compositions of the present invention may be a spray encapsulation method whereby the hypochlorite-releasing bleaching agent to be encapsulated is uniformly coated with a spray flow of the appropriate coating.

A primary advantage of encapsulation is the reduction in dye and fabric damage resulting from locally high concentrations of hypochlorite ion. Another equally important advantage of bleach encapsulation is the feasibility of including hypochlorite-sensitive laundry additives such as enzymes and optical brighteners in a comprehensive bleach system. Since hypochlorite can render enzymes and optical brighteners ineffective, the delay of bleach release makes possible the action of enzymes and optical brighteners prior to release.

Enzymes known and useful as laundry additives include hydrolases, such as carbohydrases (amylases) proteases and esterases (lipases). Preferred proteases, which attack protein-based stains such as blood and grass stains, include alkaline proteases available from Novo Industri, Copenhagen, Denmark, under the trade names Savinase, Alcalase, and Esperase. Among the commercially available amylases are those which attack carbohydrate and starch-based stains, such as an amylase available from Societe Rapidase under the trade name of Rapidase and from Miles Laboratories under the trade name of Milezyme.

Brighteners include compounds such as stilbene brighteners and their derivatives, styrylnaphthalene brighteners and their derivatives and styrene brighteners and their derivatives.

Such enzymes and brighteners may effectively be included in a halogen bleach composition providing that there is a sufficient delay in release time. The encapsulation structure of the present invention makes possible the inclusion of sensitive enzymes and brighteners in a hypochlorite or hypobromite bleach composition.

The encapsulated bleach of the present invention is effective over a wide range of concentrations. As a composition used to reduce dye and fabric damage, preferred concentrations range from about 1 to about 200 ppm, and particularly preferred concentrations range from about 5 to about 30 ppm.

The following examples illustrate certain embodiments of the present invention, and are not intended to limit the scope of the invention as defined in the appended claims.

EXAMPLE 1

Synthesis of Encapsulated Lithium Hypochlorite

A sodium silicate-coated lithium hypochlorite bleach composition was prepared as follows. A 25 wt.% aqueous solution of sodium silicate was prepared in which the weight ratio of $SiO_2$ to $Na_2O$ was approximately 2.8:1. Two hundred grams of lithium hypochlorite (30% pure, obtained from Lithium Corporation of America) were then encapsulated with the sodium silicate solution in an Aeromatic Spray Granulator, with a solution spray rate of about ten grams per minute and a spray time of approximately twenty minutes. The encapsulates were dried at about 65 degrees Celsius for about one minute before addition of a second coating.

A secondary coating of distearyldimethylammonium chloride was then applied, also with a spray granulator, using a 4 wt.% aqueous dispersion of AROSURF TA-100 (distearyldimethylammonium chloride, manufactured by Sherex Chemical Co., Dublin, OH; "AROSURF" is a registered trademark), a solution spray rate of about ten grams per minute and a spray time of fifteen minutes. As above, encapsulates were dried at about 65 degrees Celsius for about one minute. In both coating steps, fluidizing air flow was about 100 $m^3$ per hour, and atomizing air pressure was approximately constant at 2 atm.

The sodium carbonate, sodium perborate, Esperase and Tinopal (see Table 1 for relative quantities) were blended in a rotary mixer at 20 rpm for 10 minutes. The ultramarine blue was then added and blended for an additional 10 minutes. A mixture of Triton-X100 and fragrance was sprayed into the revolving mixer using an atomizing nozzle, and the batch was mixed for 2 more minutes. The encapsulates were then added to the rotary mixer and blending was continued for an additional 5 minutes. Approximate coating levels were 20 wt.% for sodium silicate and 3 wt.% for the outer coating of distearyldimethylammonium chloride.

TABLE 1

| Ingredient | Wt. % in Silicate-Coated LiOCl Bleach |
|---|---|
| LiOCl, coated with $Na_2SiO_3$ and Arosurf TA-100* | 5.65 |
| Esperase** | 0.75 |
| Sodium Perborate.4$H_2O$ | 0.77 |
| Triton-X100*** | 0.25 |
| Tinopal 5BMXC**** | 0.09 |
| Ultramarine Blue | 0.10 |
| Perfume | 0.10 |
| Sodium Carbonate | 92.29 |

*Distearyldimethylammonium chloride, manufactured by Sherex Industries, Inc.
**An alkaline protease available from Novo Industri, Copenhagen.
***Octylphenoxy polyethoxyethanol, a detergent and emulsifier manufactured by Rohm & Haas Co.
****A fluorescent whitening agent, manufactured by Ciba-Geigy Corp.

EXAMPLE 2

Release Profile for Encapsulated LiOCl versus $Ca(OCl)_2$

The complete release time profile obtained with sodium silicate-coated lithium hypochlorite was found to be significantly different from that obtained for silicate-coated calcium hypochlorite. Each of the two different hypochlorites was encapsulated with similar coating, in a manner analogous to that described in Example 1 above. A method used to verify results utilized an iodine-specific electrode to measure the iodine level of a sample in a cell to which acid and potassium iodide were added. The method, verified by means of titration and ultraviolet spectroscopy, provides chlorine release as a function of time and indicates the level of ingredient present. The results may be seen in Table 2.

TABLE 2

| | Percentage of Bleach Released vs. Temperature | | | |
|---|---|---|---|---|
| | 100° F. | | 70° F. | |
| Time (min.) | Encapsulated* LiOCl | Encapsulated** $Ca(OCl)_2$ | Encapsulated*** LiOCl | Encapsulated**** $Ca(OCl)_2$ |
| 1.5 | 2 | 0 | 1 | 0 |
| 1.9 | 4 | 0 | 3 | 0 |
| 2.2 | 12 | 2 | 6 | 0 |
| 2.6 | 18 | 3 | 9 | 1 |
| 3.0 | 36 | 5 | 11 | 1 |
| 3.9 | 82 | 16 | 24 | 2 |
| 5.0 | 89 | 26 | 46 | 4 |
| 5.5 | 95 | 31 | 56 | 4 |
| 7.0 | 100 | 45 | 84 | 6 |
| 10.0 | 100 | 61 | 99 | 10 |
| 12.5 | 100 | 70 | 100 | 14 |
| 14.5 | 100 | 82 | 100 | 21 |
| 17.5 | 100 | 87 | 100 | 28 |

*Encapsulate: 54% coating, $SiO_2$:$Na_2O$ = 2.6
**Encapsulate: 49% coating, $SiO_2$:$Na_2O$ = 2.6
***Encapsulate: 20% coating, $SiO_2$:$Na_2O$ = 2.4
****Encapsulate: 25% coating, $SiO_2$:$Na_2O$ = 2.6

As Table 2 illustrates, there is a substantial difference in the timed-release profile between silicate-encapsulated lithium hypochlorite and calcium hypochlorite bleaches. The lithium hypochlorite has a brief delay time and is completely released in under 6 minutes. The calcium hypochlorite, on the other hand, has a significantly longer delay time and is not completely released within the period of the wash cycle. After 7 minutes, less than half of the calcium hypochlorite has been released, while the lithium hypochlorite has been completely released. Moreover, at the end of the wash cycle, there is a substantial amount of calcium hypochlorite remaining (i.e., greater than ten percent of the original amount) whereas the lithium hypochlorite has completely dissolved.

EXAMPLE 3

Preparation of Encapsulates with Inverse-Temperature Coatings

An encapsulate having an outer inverse solubility coating was prepared as follows. A 25 wt.% aqueous solution of sodium silicate was prepared having a weight ratio of $SiO_2$ and $Na_2O$ of about 2.4:1. The solution was used to coat 200 g. of lithium hypochlorite (30% pure, obtained from Lithium Corporation of America) in an Aeromatic spray granulator at a solution spray rate of about 10 g./min. and at a spray time of about 20 minutes. Encapsulates were dried for about one minute at 65 degrees Celsius. A secondary coating of lithium sulfate was then applied using a coating of 25 wt.% aqueous lithium sulfate. All spray parameters were identical to those used above in Example 1, including fluidizing air flow of 100 $m^3$ per hour and atomizing air pressure of about 2 atmospheres. As above, encapsulates were dried for about one minute at 65 degrees Celsius. Approximate coating level for both the sodium silicate and lithium sulfate coatings was 20 wt.%.

A second encapsulate was prepared having an outer inverse solubility coating as follows. Two hundred grams of lithium hypochlorite, as above, were coated using a 10 wt.% aqueous solution of lithium chloride in an Aeromatic spray granulator, using a spray time of about 11 minutes. All other process parameters were identical to those given above for the sodium silicate/lithium sulfate processes. After drying, the encapsulates were coated with a second, inverse solubility coating, using a 20 wt.% aqueous solution of sodium carbonate and a spray time of 12 minutes. Again, all other parameters remained constant. Approximate coating levels were 5.21 wt.% for lithium chloride, and 11.1% for sodium carbonate.

A third encapsulate was prepared having an inverse solubility coating, using a single coating solution, as follows. Two hundred grams of lithium hypochlorite, as above, were coated in an Aeromatic spray granulator with an aqueous solution containing 25 wt.% sodium silicate ($SiO_2$:$Na_2O$ in a weight ratio of about 2.4:1) and 0.5 wt.% lithium carbonate. Spray time was about thirty minutes, and all other process parameters are as given above. Approximate coating levels were 28 wt.% sodium silicate, and 0.9 wt.% lithium carbonate.

EXAMPLE 4

Performance of Timed-Release Bleach Prototypes

Lithium hypochlorite encapsulates were prepared as in Example 1, except that the weight ratio of $SiO_2$ to $Na_2O$ in the sodium silicate coating solution was about 2.4:1. As in Example 1, the coating level was approximately 20 wt.%. The performance of these encapsulates was compared with that of unencapsulated perborate bleach, at 70 degrees Fahrenheit, in order to illustrate the effectiveness of timed release. Results are set forth in Table 3.

Lithium hypochlorite encapsulates were then prepared having a 25.1 wt.% coating of sodium silicate and a 3.6 wt.% coating of lithium sulfate, using the methods outlined above. The performance of these encapsulates was compared with that of unencapsulated perborate bleach, at 100 degrees Fahrenheit; results are set forth in Table 4.

TABLE 3

Stain Removal of Encapsulated Lithium Hypochlorite Bleach Versus Unencapsulated Perborate Bleach, 70° F.

| | Percent Removal | | | |
|---|---|---|---|---|
| | Cotton | | Polyester/Cotton Blend | |
| Stain | Perborate | Encapsulated LiOCl | Perborate | Encapsulated LiOCl |
| Mustard | 75.6 | 93.2 | 92.2 | 96.6 |
| Blueberry | 85.3 | 85.1 | 94.8 | 97.7 |
| Coffee | 66.1 | 70.9 | 90.5 | 92.2 |
| Tea | 25.0 | 34.0 | 71.6 | 68.2 |
| Permanent Ink | 58.6 | 69.7 | 64.8 | 73.3 |

TABLE 4

Stain Removal of Encapsulated Lithium Hypochlorite Bleach Versus Unencapsulated Perborate Bleach, 100° F.

| | Percent Removal | | | |
|---|---|---|---|---|
| | Cotton | | Polyester/Cotton Blend | |
| Stain | Perborate | Encapsulated LiOCl | Perborate | Encapsulated LiOCl |
| Mustard | 89.1 | 95.1 | 96.9 | 98.7 |
| Blueberry | 89.5 | 93.1 | 95.7 | 96.8 |
| Coffee | 73.5 | 81.9 | 93.6 | 95.7 |
| Tea | 39.4 | 50.8 | 75.0 | 77.8 |
| Permanent Ink | 61.9 | 85.8 | 69.8 | 85.9 |

As illustrated by the data of Tables 3 and 4, the encapsulated lithium hypochlorite bleach provides an improvement over unencapsulated perborate bleach for nearly all types of strains tested, at both higher and lower temperatures.

EXAMPLE 5

Optimization of $SiO_2$:$Na_2O$ Ratios

The effect of the $SiO_2$:$Na_2O$ ratio in the sodium silicate coating on the timed-release profile may be seen from the following. Sodium silicate-encapsulated lithium hypochlorite was prepared as in Example 1, and chlorine release times were measured as outlined in Example 2 above. Initial experimentation showed that coatings possessing higher $SiO_2$:$Na_2O$ ratios released halogen more quickly. Upon expanding the range of ratios tested, however, it was observed that as the ratio was increased up to 3.75 and higher, much longer release times were obtained. The results are listed in Table 5 below.

TABLE 5

| Sodium Silicate Ratio | Delay Release Time (min.) | | Complete Release Time (min.) | |
|---|---|---|---|---|
| ($SiO_2$:$Na_2O$) | 70° F. | 100° F. | 70° F. | 100° F. |
| 1.60 | 0.9 | 0.6 | 5.0 | 3.0 |
| 2.00 | 2.8 | 1.1 | 7.5 | 4.0 |
| 2.40 | 3.8 | 1.2 | 11.5 | 4.0 |
| 2.81 | 1.3 | 0.7 | 5.0 | 4.0 |
| 3.22 | 1.4 | 0.7 | 6.0 | 3.0 |
| 3.45 | 6.0+ | 2.0 | 22.5 | 10.0 |
| 3.50 | — | — | 14.0 | 7.5 |
| 3.60 | — | — | 25.0+ | 9.0 |

Accordingly, a preferred silicate coating comprises $SiO_2$:$Na_2O$ in a weight ratio ranging from about 0.5:1 to about 3.8:1. A particularly preferred ratio ranges from about 2.5:1 to about 3.2:1.

EXAMPLE 6

Release Profile of Inverse Solubility Encapsulates

The effect of a second coating having a solubility inversely proportional to temperature was measured as follows. A first encapsulate was prepared having a 20 wt.% coating of sodium silicate ($SiO_2$:$Na_2O$ of about 2.4) by the method of Example 1. A second encapsulate was prepared having both a 25 wt.% coating of sodium silicate ($SiO_2$:$Na_2O$ in a weight ratio of about 2.4) and an outer coating of 0.5 wt.% lithium carbonate. Release times were measured, and are set forth in Table 6.

The release times at 100° F., compared to those measured at 70° F., demonstrate that a beneficial delay in initial release of hypochlorite without unduly delaying complete release of hypochlorite is achieved using an additional inverse solubility coating. Using an inverse temperature solubility coating will thus beneficially and unexpectedly delay initial release of hypochlorite, especially at high temperatures, without unduly obstructing complete release during a period of time representing a typical wash cycle (about 15 minutes).

TABLE 6

| | Time for Release (min.) | | | |
|---|---|---|---|---|
| Percent | Sodium Silicate Coating Only | | Sodium Silicate and Lithium Carbonate Coatings | |
| Release | 70° F. | 100° F. | 70° F. | 100° F. |
| Initial | 0.4 | 0.2 | 0.6 | 0.6 |
| 10% | 2.8 | 1.2 | 3.9 | 2.0 |
| 25% | 3.2 | 1.4 | 5.3 | 2.3 |
| 50% | 5.6 | 2.0 | 6.9 | 2.8 |
| 100% | 12.4 | 5.5 | 13.1 | 6.6 |

EXAMPLE 7

Various conditions likely to be encountered in a wash were studied for their effects on release rates: pH, water hardness (measured in ppm $Mg^{++}$ or $Ca^{++}$ levels), residual fabric softener and use level of detergent. The results are listed in Table 7 below. As can be seen, none of the factors significantly affects the rate of hypohalite release. The compositions are thus unlikely to encounter any wash conditions which will radically alter their release profile.

TABLE 7

| Wash Parameters | Range | Total Release Time (Min.) |
|---|---|---|
| pH | 8.0 to 10.5 | 6.2 to 4.6 |
| Hardness | 0 to 200 ppm | 4.2 to 6.0 |
| Residual Softener | Several Sheets* | 4.9 to 6.0 |
| Usage Level of Detergent | ½ to 1½ c. | 5.4 to 4.0 |

*Several sheets impregnated with fabric softener (e.g., "BOUNCE," manufactured and distributed by Procter and Gamble Co., Cincinnati, Ohio).

EXAMPLE 8

It is known in the art that delaying introduction of bleach to the washload actually increases detergency, stain removal, and brightening. Reduced efficacy by time-zero introduction of bleach is in part due to deactivation of certain agents, such as enzymes and fluorescent whitening agents, by the bleach source. Further, soil removed from the fabric surface by the detergent allows bleach to act only on residual soilant; as such the bleach acts only on those soils or stains which the detergent cannot remove.

Clearly if the oxidant is not released in a timely manner, this benefit will not be realized. However, if the addition of the bleach can be delayed to allow these agents to act, and can completely dissolve within the period of the wash cycle, one would have fully utilized the bleach to its optimal efficiency. Table 8 lists the stain removal for unencapsulated lithium hypochlorite, encapsulated lithium hypochlorite (30% coating, $SiO_2$:$Na_2O$=3.5), and a commercial detergent control. In each case, the encapsulated lithium hypochlorite enhances stain removal.

TABLE 8

| | Percent Stain Removal | | | |
|---|---|---|---|---|
| Treatment | Blueberry | Coffee | Grass | Overall |
| Detergent Only | 79.8 | 76.1 | 69.2 | 75.0 |
| Detergent + LiOCl | 91.6 | 87.0 | 79.1 | 85.9 |
| Detergent + Encapsulated LiOCl | 92.2 | 88.8 | 82.1 | 87.7 |

| | Concentration vs. Time | | |
|---|---|---|---|
| | ppm Available Chlorine | | |
| Treatment | 1 min. | 6 min. | 12 min. |
| Detergent + LiOCl | 18.2 | 17.4 | 16.8 |
| Detergent + Encapsulated LiOCl | 0.5 | 17.6 | 15.8 |

Wash Conditions:
100° F., 100 ppm hardness (Ca:Mg = 3:1), target 20 ppm available chlorine While the invention has been described in connection with specific embodiments thereof, it will be understood that it is capable of further modification, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

What is claimed is:

1. A timed-release hypochlorite bleach composition, comprising:

granules of a lithium hypochlorite bleaching agent; and a first coating consisting essentially of sodium silicate, said coating encapsulating substantially each of said granules, thereby forming a lithium metasilicate interface around the lithium hypochlorite encapsulate, said interface having a limited solubility which will cause said first coating to release controlledly in aqueous solution.

2. The composition of claim 1, wherein said sodium silicate is comprised of $SiO_2$ and $Na_2O$ in a weight ratio of from about 0.5:1 to about 3.8:1.

3. The composition of claim 2, wherein said sodium silicate is comprised of $SiO_2$ and $Na_2O$ in a weight ratio of from about 2.5:1 to about 3.2:1.

4. The composition of claim 1, further including a second coating on said first coating, said second coating being selected from the group consisting of inversely soluble cellulose derivatives, inversely soluble polyols, and alkylated quaternary ammonium salts.

5. The composition of claim 4 wherein said second coating includes distearyldimethylammonium chloride.

6. The composition of claim 4, further including a third coating on said second coating, said third coating being a quaternary ammonium salt.

7. The composition of claim 6, wherein said quaternary ammonium salt is distearyldimethylammonium chloride.

8. The composition of claim 1, wherein said granules are initially released into aqueous solution within about 1 to 5 minutes after addition of water and are completely released within about 15 minutes.

9. The composition of claim 1, wherein said compound is effective over a temperature range of from about 40 to about 130 degrees Fahrenheit.

10. The composition of claim 9, wherein said compound is effective over a temperature range of from about 70 to about 130 degrees Fahrenheit.

11. A composition as in claim 1 further comprising an enzyme, an optical brightening agent or mixtures thereof admixed with said granules.

* * * * *